United States Patent [19]

Huang

[11] Patent Number: 5,068,565
[45] Date of Patent: Nov. 26, 1991

[54] MOTOR CONVERSION MECHANISM UTILIZING ELASTIC ACTION

[76] Inventor: DaXu Huang, 186 An Yuan Lu, Shanghai, China

[21] Appl. No.: 461,034

[22] Filed: Jan. 4, 1990

[30] Foreign Application Priority Data

Jan. 30, 1989 [CN] China .................. 89100596

[51] Int. Cl.⁵ .................. H01L 41/08; H02N 2/00
[52] U.S. Cl. .................. 310/328; 74/53
[58] Field of Search ....... 310/26, 323, 326, DIG. 323, 310/DIG. 328; 335/215; 74/128, 129, 143, 53, 54, 55

[56] References Cited

U.S. PATENT DOCUMENTS

| | | | |
|---|---|---|---|
| 3,420,975 | 1/1969 | Thayer | 335/215 |
| 4,399,386 | 8/1983 | Osaka et al. | 310/328 |
| 4,435,666 | 3/1984 | Fukui et al. | 310/328 |
| 4,513,219 | 4/1985 | Katsuma et al. | 310/328 |
| 4,782,262 | 11/1988 | Kiyo-Oka | 310/328 |

FOREIGN PATENT DOCUMENTS

| | | | |
|---|---|---|---|
| 142978 | 6/1986 | Japan | 310/328 |
| 295916 | 12/1986 | Japan | 74/55 |
| 645182 | 1/1979 | U.S.S.R. | 74/129 |

*Primary Examiner*—Steven L. Stephan
*Assistant Examiner*—D. L. Rebsch

[57] ABSTRACT

A motion conversion device has actuator sets attached to a housing, the housing surrounding a rotary actuator. Each actuator set includes an actuator and an elastic mechanism to contact the rotary member so that it may be driven. The device changes micro amplitude oscillatory motion into continuous rotary or straight line motion. The rotary actuator can have a wavy shape.

27 Claims, 14 Drawing Sheets

FIG. II

MOTOR CONVERSION MECHANISM UTILIZING ELASTIC ACTION

FIELD OF THE INVENTION

The present invention relates to motion conversion mechanisms utilizing elastic action, particularly to those mechanisms which utilize elastic mechanisms or elasticity of the actuators to convert various micro-amplitude oscillatory motion into continuous rotary or straight line motion, and electric motors incorporating the said motion conversion mechanisms.

BACKGROUND OF THE INVENTION

Conventional electric motors in general make use of electro-magnetic effects and derive driving force or moment from the interaction of electric current and magnetic field, but a new kind of electric motor utilizing electrostrictive effect has been developed recently. It is generally known that many piezoelectric elements exhibit a reverse effect. The electrostrictive effect and the prospect of developing a new electric motor based on the electrostrictive effect is very attractive, because these electric motors, which are entirely different from the electromagnetic motors, have many advantages such as fast response, ease of control, high torque at low speeds, and so are especially suitable for automatic control robotic applications.

Some achievements of research on piezoelectric electric motors has already been published in U.S. Pat. No. 4,513,219 and 4,399,386. In these patents, two kind of rotary electric motors using piezoelectric elements are described. The basic structural peculiarity of these motor lies in the use of a plurality of equally spaced piezoelectric elements circumferentially disposed. When ac or pulsed dc voltage is applied sequentially to these elements, following a certain pattern, the piezoelectric elements will oscillate in a curvilinear orbit, and the output rotor will then be driven continuously by the oscillatory motion of the piezoelectric elements through the frictional contact of the rotor with the piezoelectric elements.

But the above mentioned mechanisms are plagued by the following shortcomings:

1. The oscillatory motion of the piezoelectric elements is not compatible with the continuous uniform motion of the output rotor. Effective motion transfer occurs only during less than one half of the oscillatory cycle, resulting in low efficiency;

2. Creep between the piezoelectric elements and the friction material of the output rotor will cause power loss and wear;

3. When the mechanism is overloaded or reverse drive takes place by external load, serious wear or even failure will occur;

4. Because of the presence of creep between the piezoelectric elements and the output rotor, the output speed is dependent on the external load;

5. High speed operation is unattainable;

6. The arrangements of such prior art patents can only be adapted to miniature motors, high power application is infeasible

SUMMARY OF THE INVENTION

To overcome the shortcomings of the above mentioned piezoelectric motors, the present invention is a motion conversion mechanism utilizing elastic action for converting micro-amplitude oscillatory motion into continuous rotary or straight line motion, the input oscillatory motion being driven from electrostrictive, magnetostrictive or thermal expansion actuators.

An additional aim of this invention is to provide an electric motor which overcomes the shortcomings of the aforementioned piezoelectric motor of the prior patents.

The principle and construction of the present invention is explained as follows:

The micro-amplitude motion conversion mechanism comprises a moving mechanism and a plurality of micro-amplitude actuator sets, the output motion displacement of each actuator is converted into increments of elastic force acting on the moving mechanism by the elasticity of the mating elastic mechanism in the actuator set or the elasticity of the actuators themselves. Owing to the combined effect of the elasticity of each individual actuator set, an elastic field is formed around the moving mechanism, for every possible position of the moving mechanism there corresponds to a particular level of elastic potential energy of the system. Since the complete system always tend to move toward the state of minimum energy, the moving mechanism will move to the minimum energy position to decrease the potential energy of the system. When the output state of the micro-amplitude actuators is changed due to external excitation, the resulting perturbation on the elastic field will cause motion of the moving mechanism to attain new state of minimum energy. By using appropriate moving mechanisms, and appropriate elastic mechanism or elastic actuator together with proper excitation and commutation to perturb the elastic field through the output of the actuators, required motion of the moving mechanism can be realized.

According to the basic concept just discussed, the following mechanisms may be proposed:

A micro-amplitude motion conversion mechanism comprises a moving mechanism with a moving member, a plurality of equally spaced actuator sets disposed around the moving mechanism, each of the said actuator sets at least including an actuator, an elastic mechanism, which may be a separate member or integral with the said actuator, a stationary extremity fixed to the housing or the like and an output extremity, the said moving mechanism further including a working member which drives the moving member in rotary or straight line motion, the working member having a specially shaped working surface simultaneously in contact with the output extremities of all actuator sets, the actuator sets being positioned to be properly preloaded so that the elastic mechanisms or the elastic actuators are always loaded in compression under normal operation, because of the proper shape of the working surface and the appropriate positioning of the actuator sets in relation with the working member, the working member being driven by the resultant of the elastic forces of the said actuator sets toward a point which moves as the external excitation changes, then the required motion is generated by the combined action of the microamplitude output motion of the actuator sets.

As compared with the existing mechanisms, the following advantages are apparent:

1. The actuators' oscillatory output motion is just the type of motion required to perturb the elastic field, and the actuators do work throughout the entire working cycle;

2. No sliding occurs during operation of the said mechanism, so wear is minimized;

3. From the foregoing described example of implementation, it can be seen that the mechanism can be reverse driven without causing damage, for example, it can be used as a generator to provide dynamic braking;

4. When the said mechanism is powered by ac, it works as a synchronous motor, and its output speed is very stable regardless of the load it drives;

5. Since hysteresis in electrostrictive phenomena is negligible and mechanical hysteresis can be minimized by suitable chaise of material, output speeds of $10^5$ rpm can be attained, far exceeding that attained by friction means, 6. No theoretical limit of power exists when this invention is used as motors; motors with very large horsepower can be made;

7. For actuators with output in the form of displacement such as electrostrictive actuators, their output power is closely related to the characteristics of the load it drives. In this invention, properly selected characteristics of elastic mechanism and proper choice of structural parameters can maximize the output power of the actuators.

BRIEF DESCRIPTION OF THE INVENTION

DETAILED DESCRIPTION OF THE PREFERRED EMBODIMENTS

Figure 1:
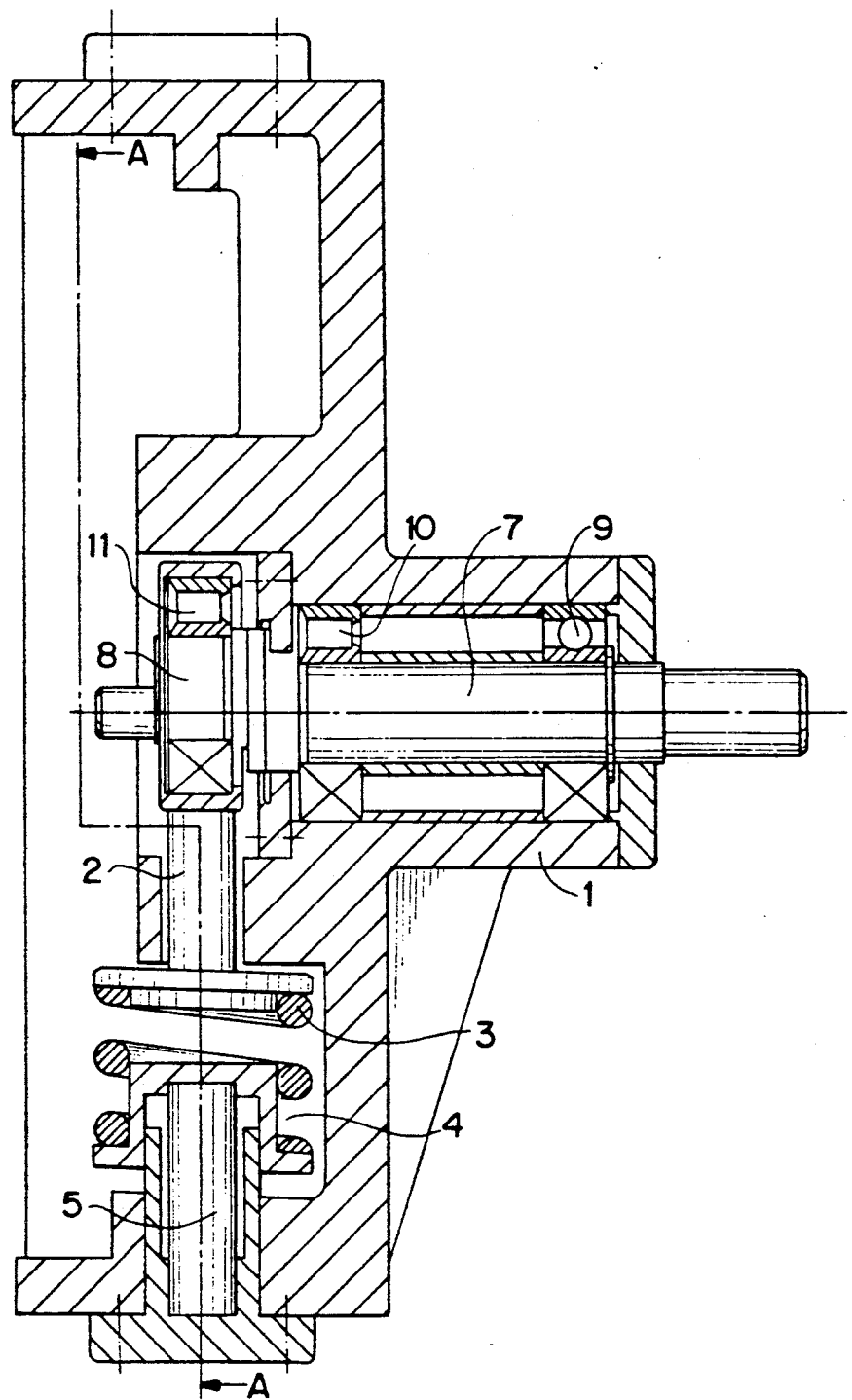
FIG. 1 is a schematic drawing of an embodiment of this invention.
Figure 2:
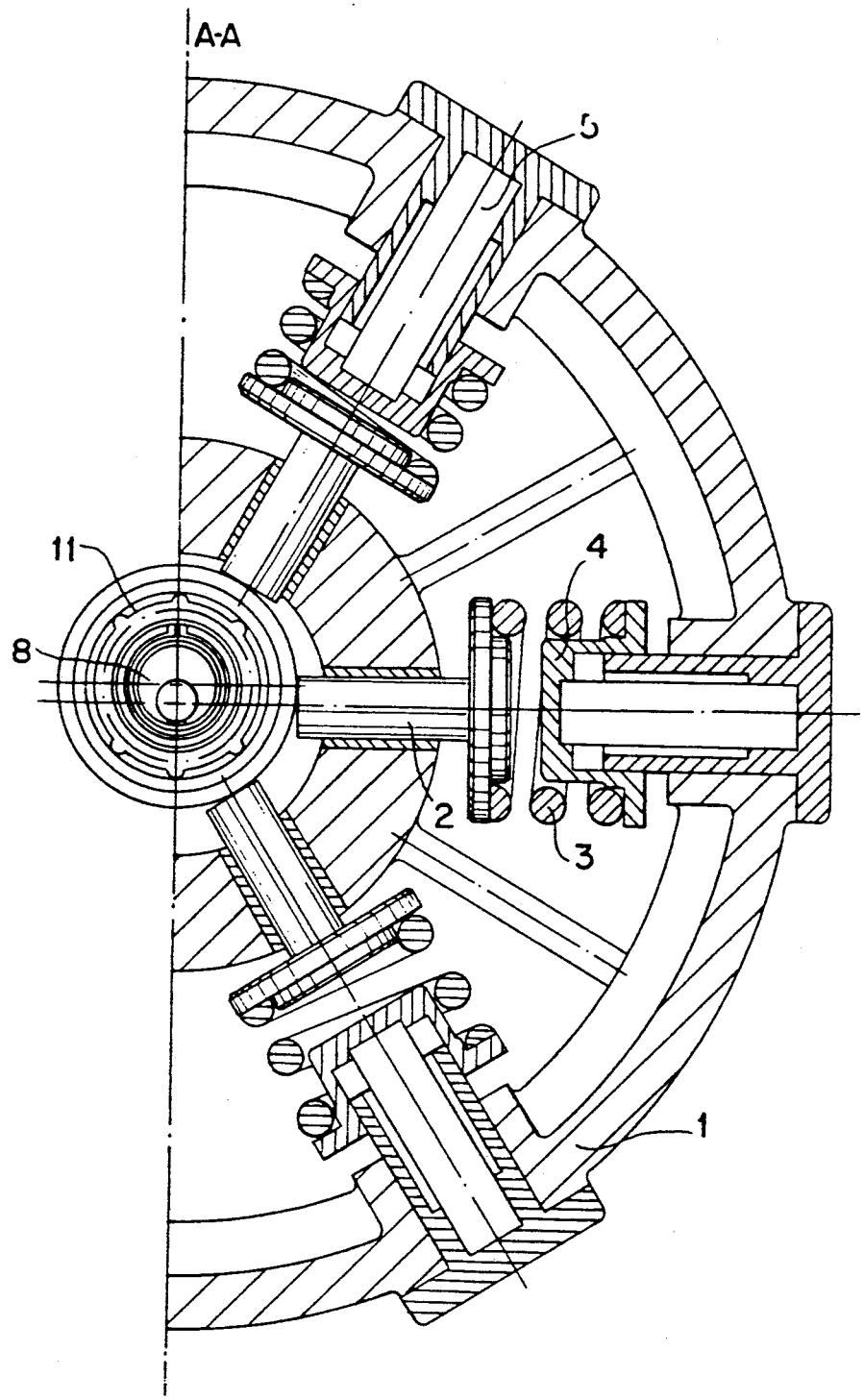
FIG. 2 is a sectioned view of FIG. 1 through A—A thereof.

Referring to FIG. 1 and FIG. 2, in these Figures an embodiment of this invention is shown. Because of symmetry of the structure, only half of the structure is shown together with a section thereof through line A—A.

This mechanism comprises a spindle 7 as the moving member, the actuator assemblies and others. Spindle 7 is supported by a roller bearing 10 and a ball bearing 9 at the center of the housing 1, and the eccentric journal 8 and the roller bearing 11 fitted over it act as the working member and are located at one end of the spindle, the axis of the spindle 7 and the axis of the eccentric journal 8 being parallel and at a distance apart. Six actuator assemblies are disposed symmetrically about the center of the spindle around the bearing 11. The front end of each actuator is plunger 2 set in contact with the bearing 11. Since one end of the actuator acting as the stationary extremity of the actuator set is fixed to the housing 1, when the actuator 5 is excited to change its length, the other end changes its compression on the spring 3 through spring seat 4, hence the micro-amplitude output displacement is transformed into variation of elastic force acting on the bearing 11 through the plunger 2. A two-dimensional central elastic field is formed between the six actuator assemblies and the eccentric pin 8. The eccentric pin 8 always tends to move in the field toward the position corresponding to the minimum potential energy of the systems. When the outputs of the actuators 5 are equal, the center of the elastic field coincides with the axis of the spindle 7, and the eccentric pin 8 is in neutral equilibrium. When the actuators 5 are excited so that their output displacements conform to some particular pattern, the elastic field is perturbed such that its center no longer coincides with the axis of the spindle 7, and then the eccentric pin 8 and bearing 11 will move in search of a position of minimum potential energy. In actual application, by coordinated excitation of the actuators 5 the position of minimum potential energy rotates around the axis of the spindle, the eccentric journal also rotating in response. Thus, the micro amplitude oscillatory motion is converted into continuous rotatory motion of the spindle.

More than one form of element can be used in this mechanism as actuators, such as electrostrictive elements magnetostrictive elements and thermal expansion elements. When electrostrictive elements are used, this mechanism becomes an electric motor. Here the external excitation source can be a periodical electric source such as ac main or a dc power source with a commutating device as used in existing techniques.

Many electrostrictive elements now available can be used. In the piezoelectric motor, a good material for the actuator is lead zirconate titanate.

Figure 3:
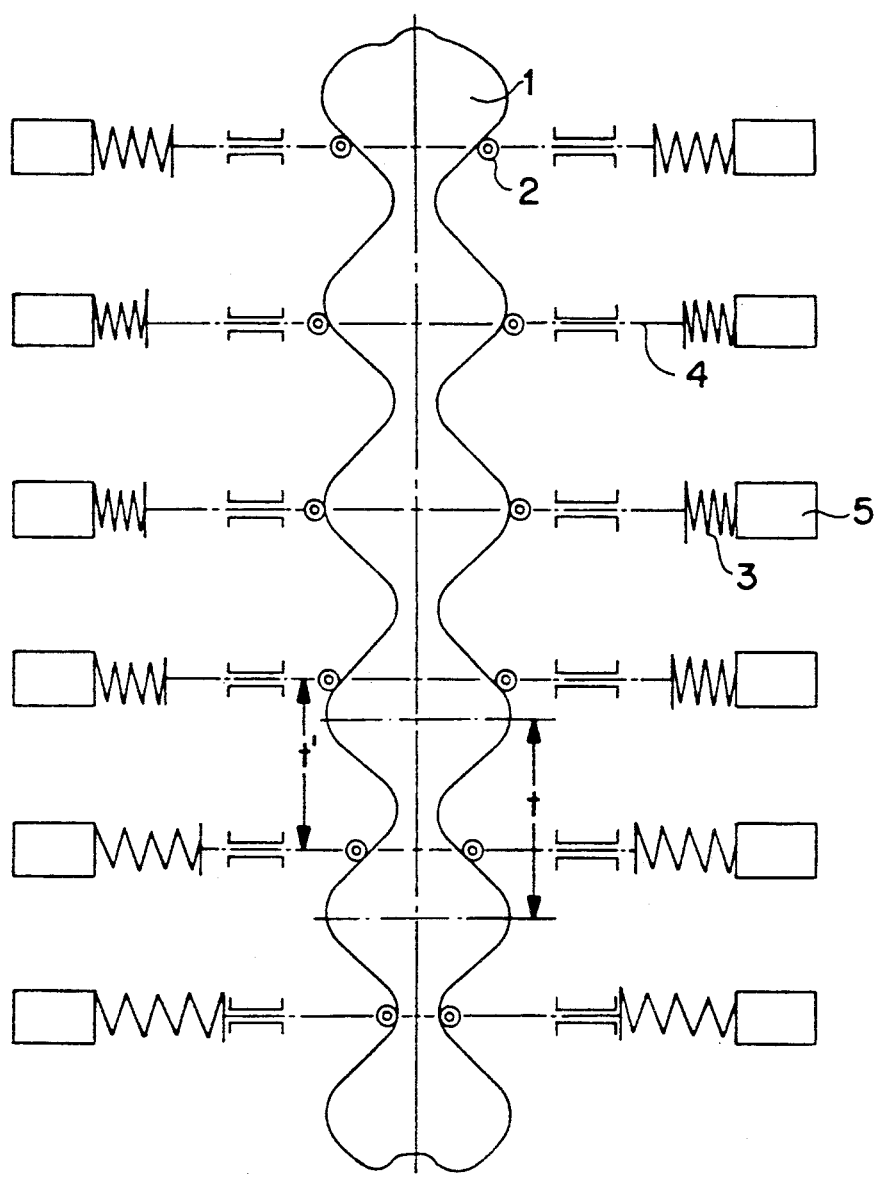
FIG. 3 is a schematic drawing of another embodiment of this invention.

Referring to FIG. 3, another embodiment of the present invention is shown. This is a mechanism for converting the micro amplitude oscillatory motion into continuous straight line motion. It can be used as linear motor. In this figure, the working member is a straight member with periodically arranged wavy surface symmetrically located on both sides of the member, the member can be moved longitudinally, a plurality of actuators are arranged in opposed pairs and are equally spaced along the working member with their axes perpendicular to the axis of the working member and symmetrical with respect to it, the two sets of actuators have identical working surfaces and identical external excitation and are driven in parallel to increase the output. Using only one set of actuators is also possible with only one working surface, but then the side thrust must be balanced out by some means.

In this embodiment all actuators 5 are fixed at one end, the other end being provided in contact with springs 3, each actuator pushing the rollers 2 at the end of the plunger 4 against the working member 1 through spring 3 and plunger 4. For any position of the working number relative to the actuator set there exists a pattern of external excitation such that the resultant of elastic forces on the working member are directed along a given direction to produce longitudinal motion, thus converting the micro-amplitude motion into continuous straight line motion.

Owing to the rolling contact between the rollers and the working surfaces, the friction loss of the system is minimized.

The working surface is a smooth cylindrical one with a periodical feature; the actual shape depends on the functional relationship between the output displacement of the actuator 5 with given input excitation and the straight line motion of the working member.

The distance t' between the actuator 5 and the period t of the working surface mast conform with a certain condition, in this example, t and t' satisfies the following equation:

$$t' = me \pm t/n \tag{1}$$

In equation (1), m is any integer and n is the number of actuators 5 on one side of the working surface.

The moving member can be an integral part of the working member 1; it can also be attached to the working member.

The electrical power sources for exciting the actuators may be the same as in the embodiment shown an FIG. (1) and FIG. (2). The working condition and the structure of the actuator assemblies may also be the same as those in the first example shown in FIG. 1 and FIG. 2 The difference lies in the form of output, where straight line motion replaces rotary motion.

Figure 4:
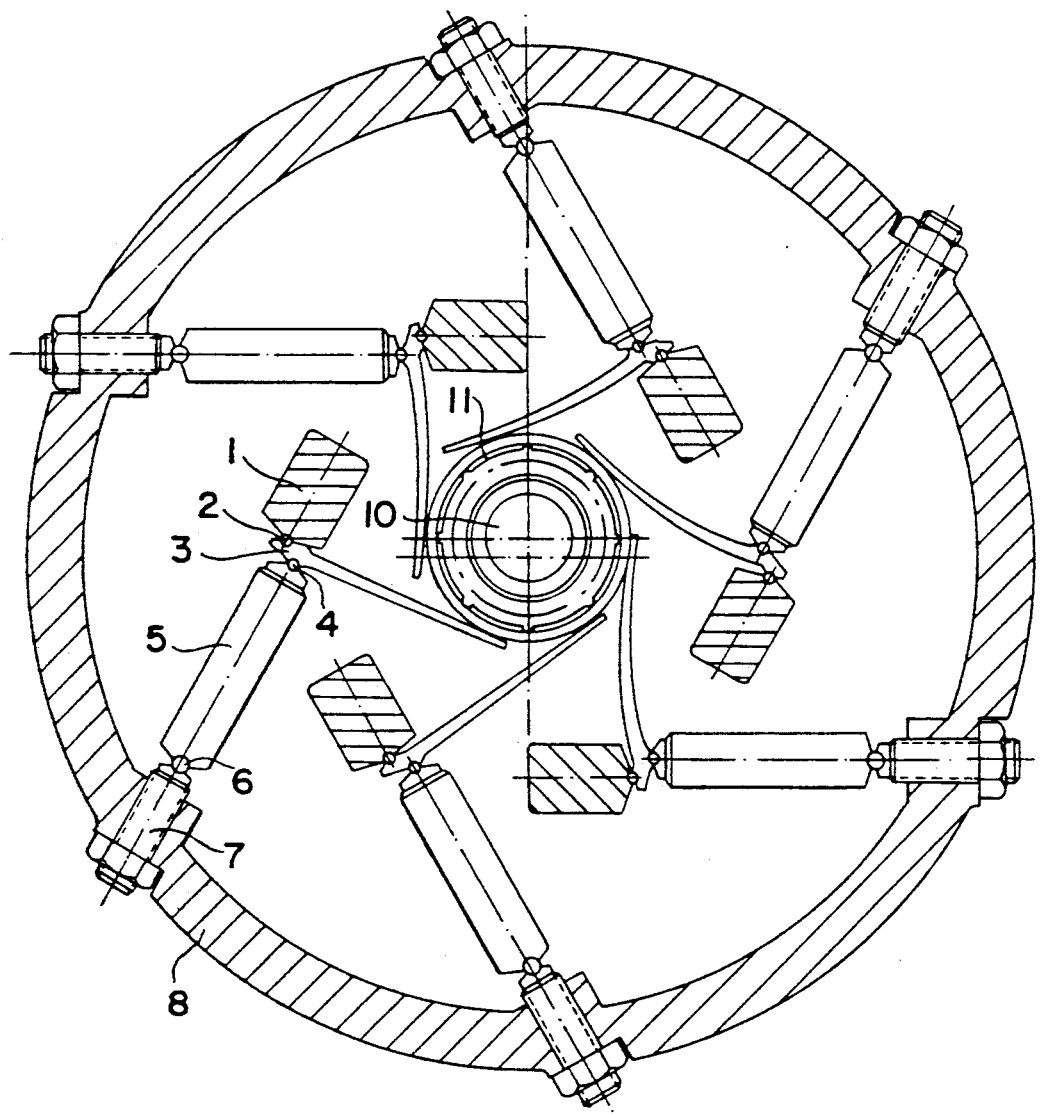
FIG. 4 is a schematic drawing of the third embodiment of this invention.

Referring to FIG. 4, elastic levers 3 replace springs 3 shown in FIG. 1. Near the center of the housing is the eccentric journal 10 and the bearing 2 fitted over it. Six actuator assemblies are disposed symmetrically at t, the canter of the housing 8 around the bearing 11. Each assembly has a bracket 1 fixed to the housing 8, an adjusting screw 8 on the periphery of the housing 8, an elastic lever 3, and an actuator 5. The elastic levers 3 are hinged at pivots 2 and 4 with bracket and actuator 5 respectively. The other end of each actuator 5 is hinged to an adjusting screw 7 by a spherical pivot. The adjusting screws 7 can be used to adjust the initial position of the actuator 5 and elastic lever 3. When the actuator 5 delivers micro amplitude displacements, it pushes the elastic lever to rotate around pivot 2. Because the difference in length between the two segments of the lever on either aide of the pivot 4 is very large, the displacement at the other end of the lever as the output extremity of the actuator set is amplified, the displacement is then transformed into incremental force acting on the bearing 11. It can be seen that this mechanism can also convert the micro-amplitude oscillatory output motion of the actuator into continuous rotary motion.

Figure 5:
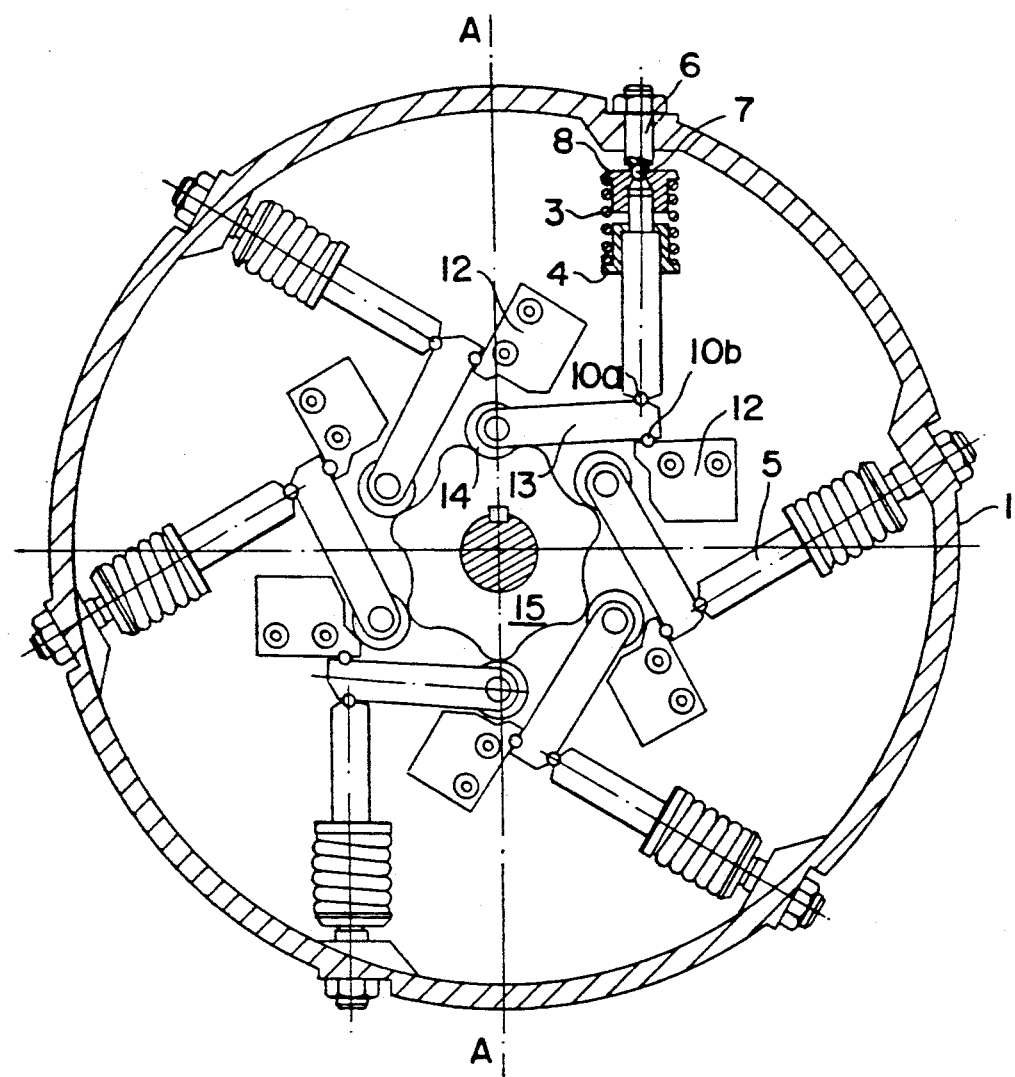
FIG. 5 is a schematic drawing of the fourth embodiment of this invention.
Figure 6:
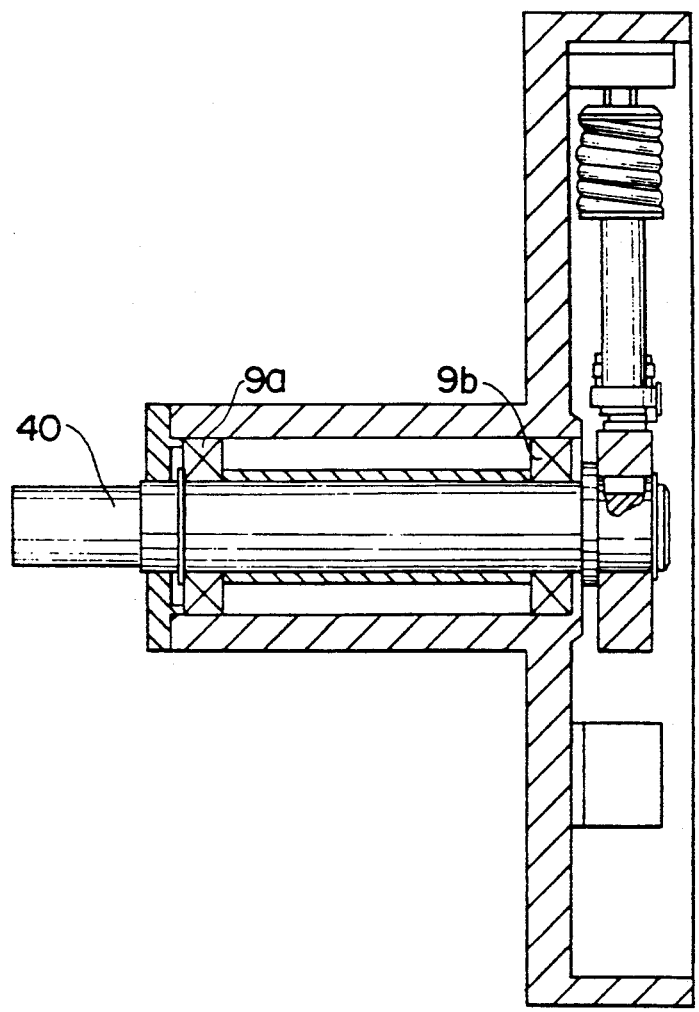
FIG. 6 is a sectional view of FIG. 5 through A—A thereof.

Referring to FIG. 5 and FIG. 6, two alternative embodiments of the invention are shown in FIG. 5 and FIG. 6. One embodiment adds a rigid lever system for each actuator set to amplify the output displacement, the other adopts a multi-wave working surface to increase the output torque.

In FIG. 2, the actuators 5 matched with springs 3 act on a working surface through plunders 2. In this example, adjusting screws 6 are threaded to the housing 1, and connect with the outer spring seat 8 through spherical hinge 7 to adjust the preload on spring 3. The inner spring seats 4 press against the actuators 5. Other differences from FIG. 2 include a rigid lever system added into the actuator set comprising rigid lever 13, stationary supporting block 12, the rigid lever 13 hinging with actuator 5 and stationary supporting block 12 about cylindrical hinges pins 10a and 10b respectively. At one end of the rigid lever 13 is a roller 14, the roller and the hinge pin 10a is situated on the same side of hinge pin 10b and is much nearer to the hinge pin (10b), hence the actuating arm of the lever is smaller than resisting arm, the hinge pin 10a acted upon by the actuator 5 is the input point of force, the actuating point, and the hinge pin 10b is the fulcrum. Because of the action of the lever, the output displacement of the actuator 5 is greatly amplified at the roller which acts as the output extremity of the actuator set. Here, the fulcrum is fixed to the stationary block 12 while the stationary block 12 is attached to the housing 1.

The amplification of displacement is accompanied by reduction of force; the reduced load on the roller and the output shaft reduces friction loss and increases efficiency.

Another improvement in this example is in the selection of the working surface. Here, the working surface is a regular multi wave cam 15 with the center of rotation as the center of symmetry. In FIG. 5 the number of sinusoidal waves on the cam is 7. For each rotation of the cam, each wave interacts with each individual actuator set 5 once; for m waves the number of interaction is m, hence the output torque is m times the output torque as in the case of a working surface with a single wave, the eccentric working surface can be interpreted as a single wave working surface.

Let m be the number of waves of the working surface, n be the number of actuator sets; if m, n satisfy the following equation, the system is desirable:

$$m = q \, n \pm r \tag{2}$$

In equation (2), m, n, q, r are positive integers, and n/r 3.

In this example, by taking q=1, n=6, r=1 and the "+" sign, then m=7, so these are 6 actuator sets used in conjunction with a working surface having 7 waves.

When this mechanism is used in electric motors, output torque is multiplied, especially when it is used in a dc mode of operation, torque can be increased without decreasing speed, hence very high power density can be obtained.

Although two improvements are adopted simultaneously in this example, it does not imply that they must always be adopted simultaneously. As is obvious, both can be adopted or either one can be adopted singly. For example, a rigid lever can be coupled with an eccentric working surface, or a multiwave working surface can be coupled to an elastic mechanism, provided that the actuator set incorporates structure and shape compatible with the working surface.

Figure 7:
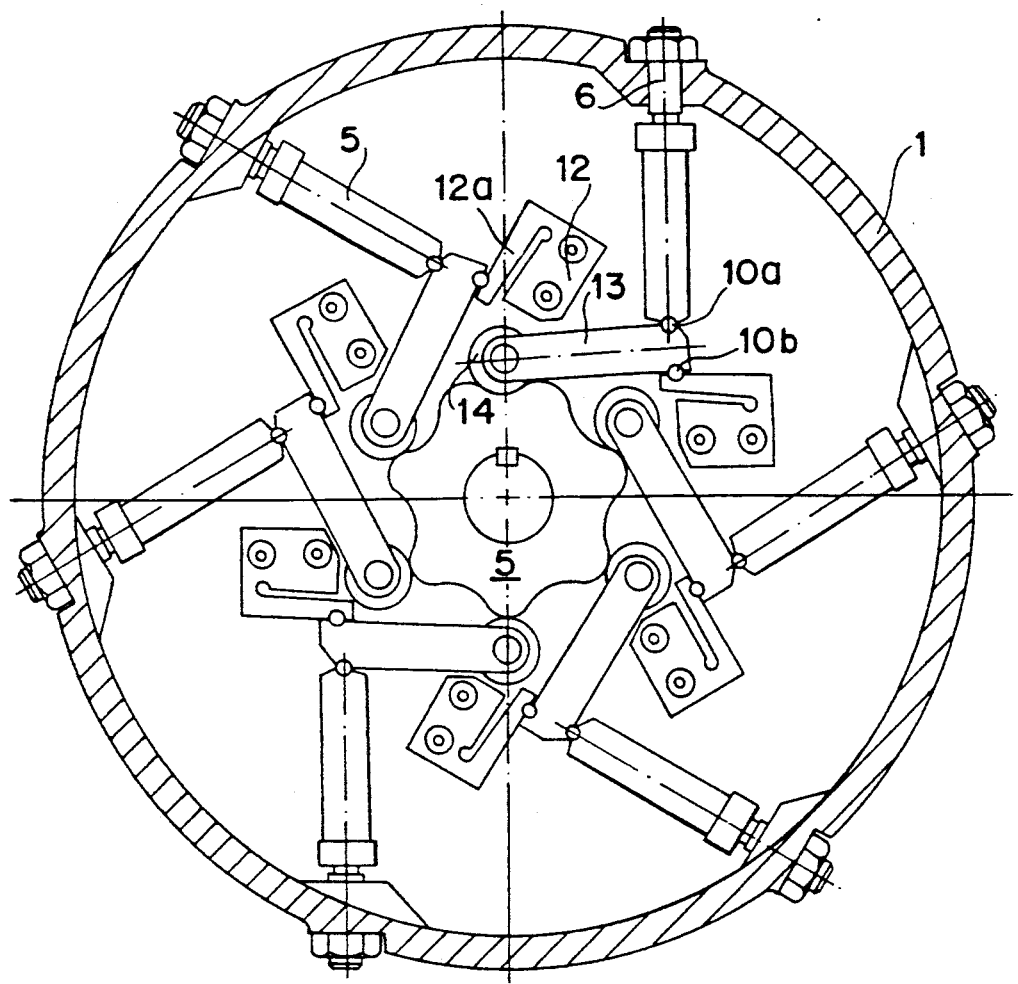
FIG. 7 is a schematic drawing of the fifth embodiment of this invention.

Referring to FIG. 7, the example shown in FIG. 7 can be taken as a variation of the example shown in FIG. 5. In FIG. 5, spring 3 is adopted for the elastic mechanism and is disposed between the actuator 5 and a stationary point on the housing 1, the stationary point forming the first stationary extremity of the actuator set, the fulcrum of the lever—pin 10b connected to the housing 1 through the stationary supporting block constituting another stationary extremity of the actuator set. By changing the position of the elastic mechanism such that the elastic mechanism is disposed between the fulcrum pin 10b and the stationary supporting block, and hinging the end of the actuator firmly in contact with the spring with a stationary point on the housing, the example shown in FIG. 7 is obtained. In FIG. 7, stationary supporting block 12 carries an elastic arm 12a, rigid lever 13 is hinged to the elastic arm 12a through pin 10b, pin 10b is still the fulcrum, the elastic arm acts as the elastic mechanism, and the spring is no longer needed. The merit of this example is simplicity.

Figure 8:
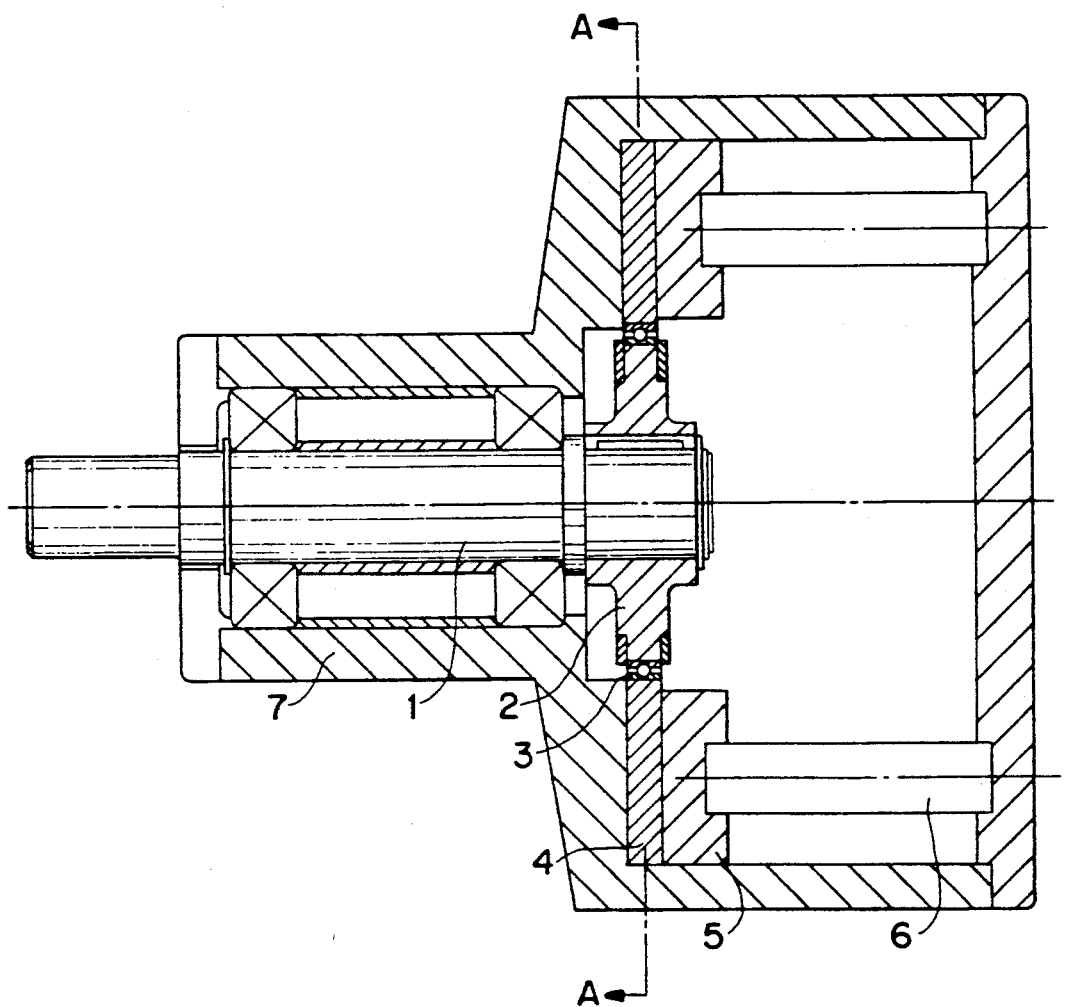
FIG. 8 is a schematic drawing of the sixth embodiment of this invention.
Figure 9:
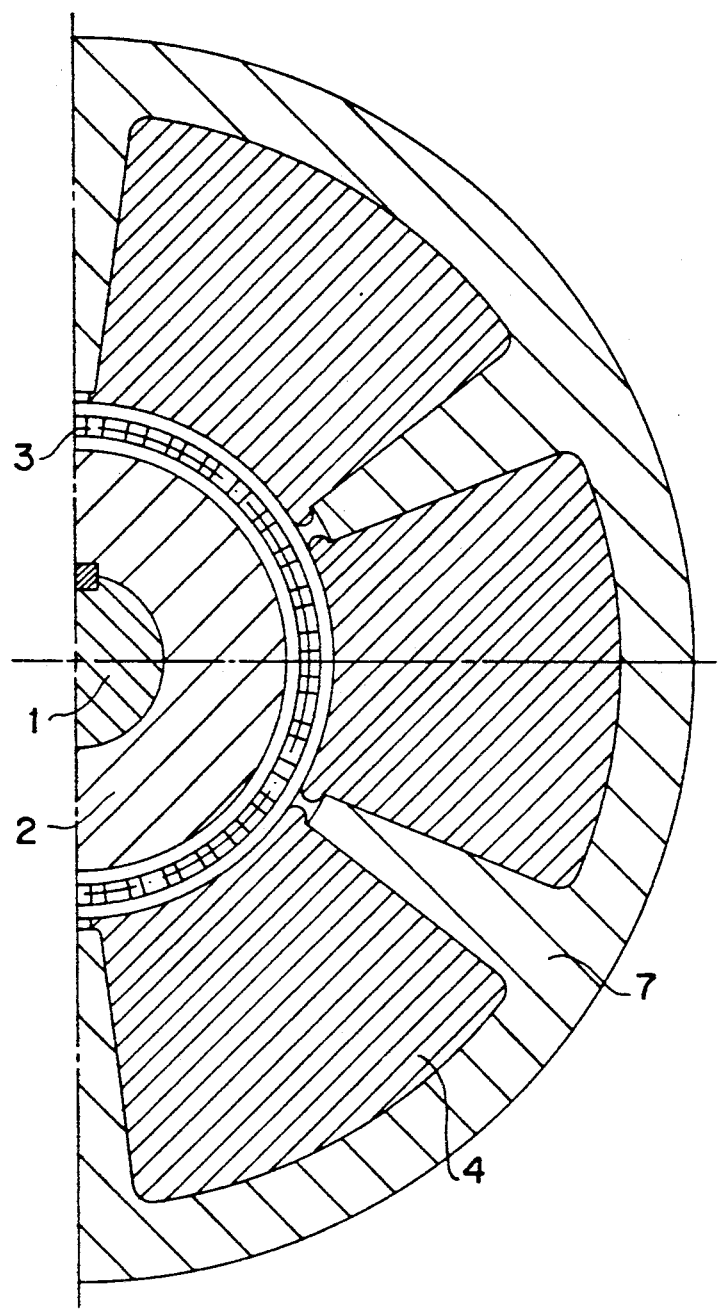
FIG. 9 is a sectional view of FIG. 8 through A—A thereof.

Referring to FIGS. 8 and 9, another embodiment of the invention illustrated. The differences between this form and the one shown in FIG. 1 and FIG. 2 including the replacement of spring by an elastomer block, and the replacement of eccentric journal by elliptic rotor and flexible bearing.

As shown in the figure, the output displacement of the actuator 6 in a direction parallel to the axis of the spindle presses against a prismatic segmental elastomer block 4 through a rigid segmental pressure plate 5 to make the elastomer block 4 expand laterally (radially of the axis of the spindle 1). Since the elastomer block is restrained on three sides by the housing 7, expansion is allowed only on the side which is in contact with the flexible bearing. The flexible bearing 3 which is fitted over the elliptical rotor 22 is also elliptical in shape, the outer race of the flexible bearing is a thin steel ring which changes shape as the elliptical rotor rotates relative to it. Thus, in accordance to the principle just mentioned, when the actuators 6 are excited to deliver coordinated micro-amplitude displacement, the elastomer block 4 will exert force on the race of the flexible bearing to make its shape change, forcing the inner race of the flexible bearing 3 and the elliptical rotor 2 to change orientation and rotatably driving the spindle attached to the elliptical rotor, thus accomplishing the aim of the present invention.

Figure 10:
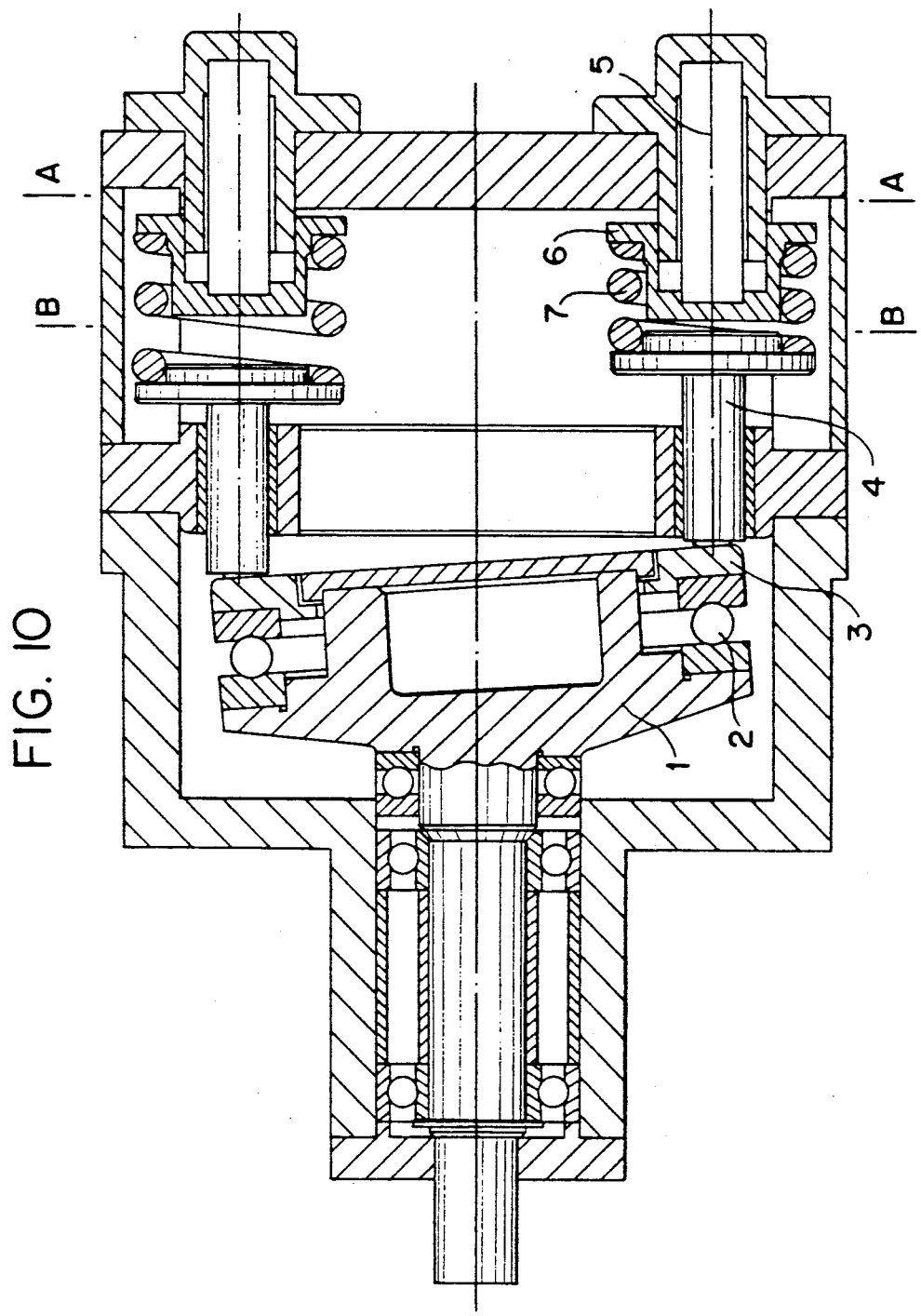
FIG. 10 is a schematic drawing of the seventh embodiment of this invention.
Figure 11:
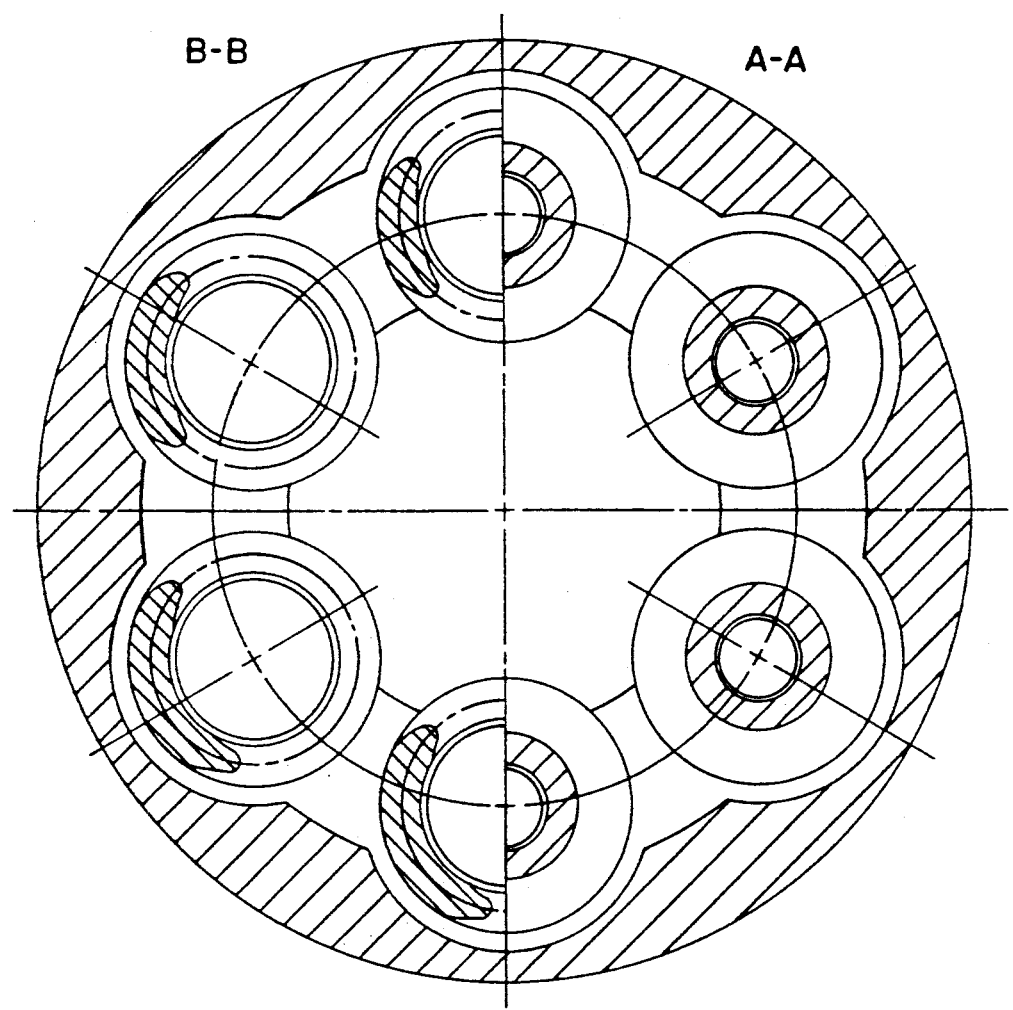
FIG. 11 is a sectional view through section line A—A of FIG. 10 in the left side thereof.

Referring to FIG. 10 and 11, another embodiment is illustrated. In this example an inclined disc is used as the working member and the actuator are disposed axially.

This mechanism consists of an inclined disc A1 attached to a spindle, a thrust bearing 2 fitted on the inclined disc 1, a thrust disc 3 on the thrust bearing, and the actuator 5, spring seat 6, spring 7 and plunger 4 which are the same as those in the example given in FIG. 1.

The normal of the inclined disc 1 makes a small acute angle with the axis of the spindle, the disc nutates around the axis of the spindle as the spindle rotates, and the thrust disc can rotate relative to the inclined disc.

The output displacement of the actuator 5 is transformed by the spring 7 into variations of force which act on the thrust discs 3 through the plungers 4. A plurality of such spring 7 act together to form a one-dimensional elastic field, in this case, six springs are used, as shown in FIG. 11. When all the output displacements of the actuators 5 are equal, the direction of the elastic field is the same as the direction of the axis of the spindle; when the output displacements of the actuators 5 are not equal and conform to a certain pattern, the direction of the elastic field thus formed is inclined to the axis of the spindle and the inclined disc is forced to move toward the position of minimum potential energy. When the output displacement of the actuators are varied in a coordinated manner so as to make the direction of the elastic field move on a conical surface, the inclined disc will rotate in response.

Figure 12:
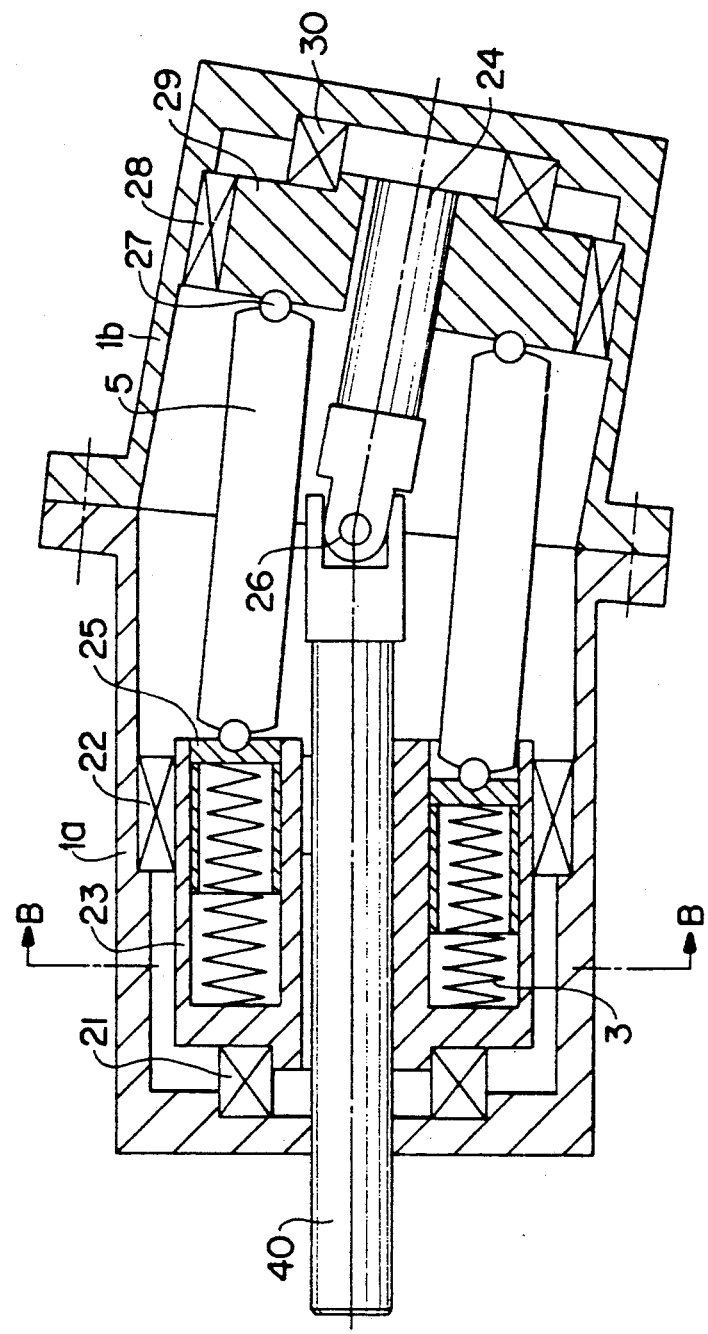
FIG. 12 is a schematic drawing of the eighth embodiment of this invention.
Figure 13:
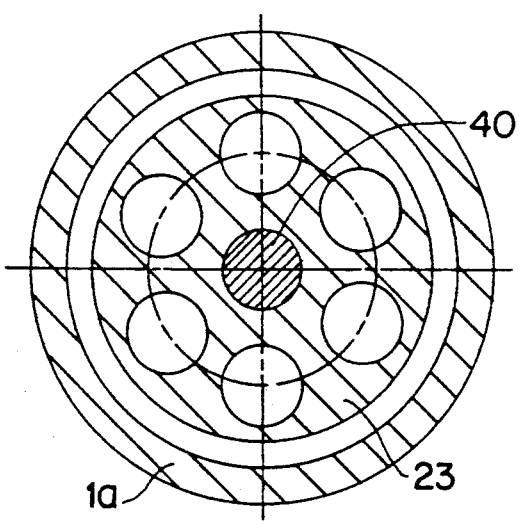
FIG. 13 is a sectional view of FIG. 12 through B—B thereof.

Referring to FIGS. 12 and 13, another micro-amplitude motion conversion mechanism comprises too non-coaxial rotors connected to rotate at the same speed, the actuator set being disposed between the two rotors.

The housing is made up of left and right parts connected together and inclined to each other at an angle, the first rotor 23 is supported in the left part of the housing by bearing 21, 22, a sectional view through B—B being shown in FIG. 13. The rotor has six symmetrically disposed cavities, with spring 3 and sliding spring seat 25 fitted in each of the cavities. Output shaft 40 is rigidly connected with the first rotor 23. The structure of the right part of the housing 1b is similar to the left part 1a. The second rotor 29 is supported by the bearing 28, 29. The inclined shaft 24 is rigidly connected to the second rotor 29. The shafts 40 and 24 are connected by universal joint 26. Six actuators are equally spaced and connected to sliding spring seats 25 and the second rotor through spherical hinges on both ends of each of the actuators.

Apparently, the compression of each of the springs 3 varies with the output displacement of the actuators and the angular position of the corresponding actuators. Under the combined action of all springs, the system tends to move to the position of minimum potential energy, hence inducing rotation. The principle is the same as explained in the preceding discussion.

Although the power output of this system is transmitted through the output shaft 40 of the left part, the power output through the inclined shaft 34 of the right part is also possible, if the inclined shaft is suitably lengthened. No difference exists between the two cases except for the angle between the axes of rotation.

Figure 14:
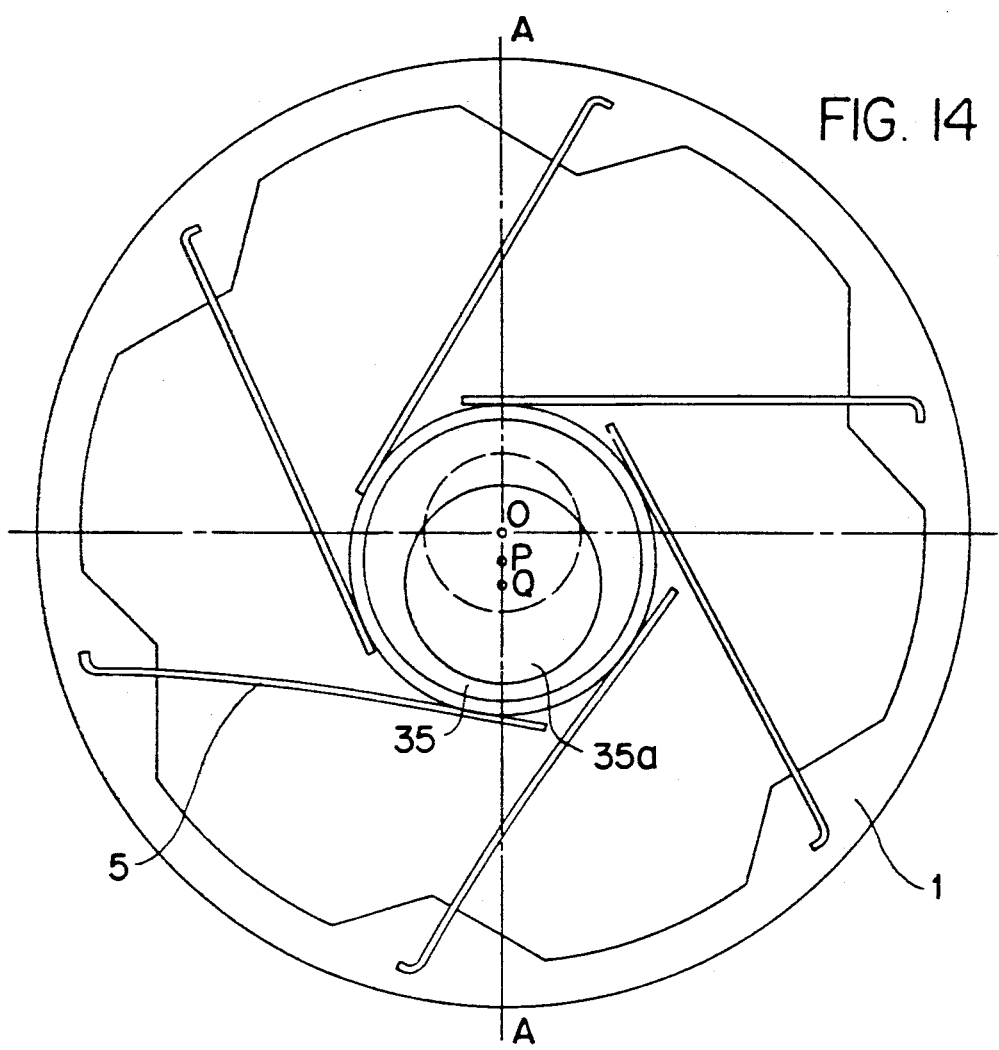
FIG. 14 is a schematic drawing of the ninth embodiment of this invention.
Figure 15:
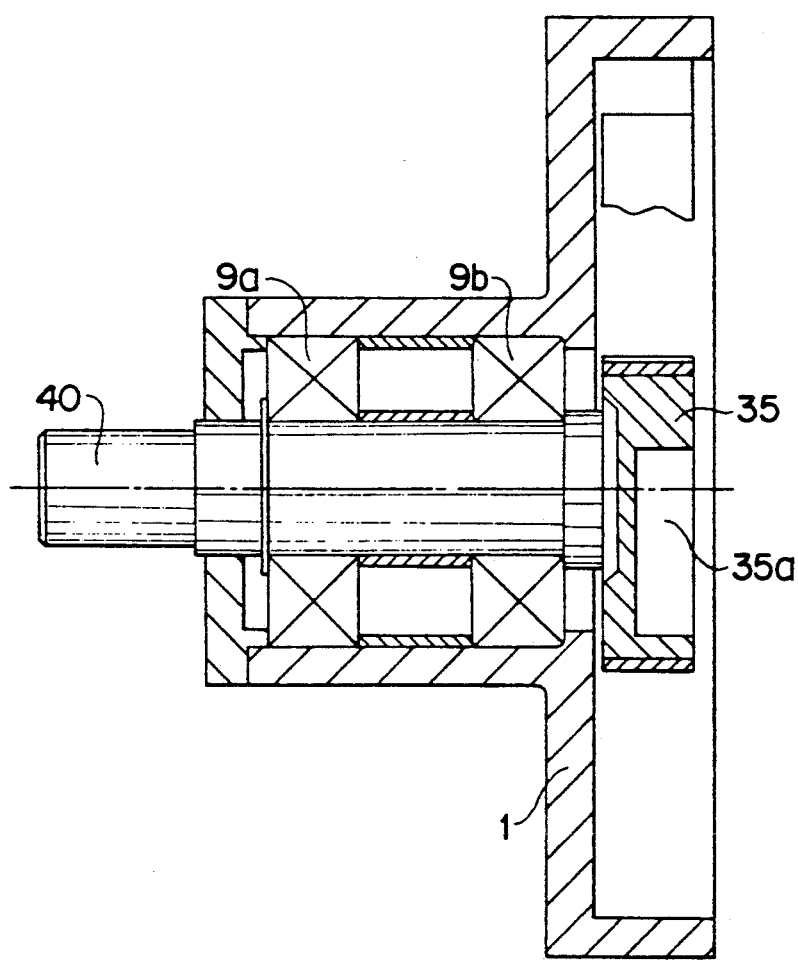
FIG. 15 is a sectional view of FIG. 14 through A—A thereof.

Referring to FIGS. 14 and 15, An embodiment without explicit elastic mechanisms is shown. The working member of this mechanism is an eccentric rotor. As shown in the figures, shaft 40 is supported by a pair of bearings 9a and 9b, with center at O. The working member on one end of the shaft is an eccentric circular rotor 35 with center at P, not coinciding with O. A circular balancing cavity 35a in the eccentric rotor 35 with center at Q makes the center of gravity of the eccentric rotor 35 remain at O. The working surface is a circular cylinder. Actuators 5 are vane type actuators made of composite of metal and piezoelectric ceramic such as the product of Piezo Electric Product Inc. of U.S.A. One end of the actuator 5 is fixed in the housing 1, the other end is preloaded against the eccentric rotor 35. It is evident that the deflections of the actuators are different under the constraint of the rotor 35, and so exert different elastic force on the eccentric rotor 35; meanwhile, the deflection of the actuators changes in response to external excitation under free state; under the constrained condition the radial elastic force exerted by the actuator on the rotor changes in response to the external excitation. As the actuator 3 in itself possesses elasticity, serving the function of an elastic mechanism, the incorporation of an independent elastic mechanism is no longer necessary.

Due to the elimination of an independent elastic mechanism, this example features simplicity, light weight and compactness, hence leading to reduction of production cost, and miniaturization.

It can be seen from the foregoing discussion that many methods can be used to accomplish the object of this invention in accordance with the basic concept of the present invention, the actual structure can be varied. All structures conforming to the specific requirement of particular application are desirable.

I claim:

1. A motion conversion mechanism for converting micro-amplitude oscillatory motion into continuous motion related to said oscillatory motion:
   a moving mechanism including a moving member,
   a housing supporting said moving mechanism
   a plurality of actuator sets equally spaced around said moving mechanism, each actuator set including at least an actuator and an elastic mechanism operatively connected in series with the said actuator, each actuator set also including an output extremity and a stationary extremity attached to a fixed point on the housing,
   said moving mechanism further including a working member which drives the moving member to produce the continuous motion;
   said working member having a shaped working surface acted on by all of said actuator sets the elastic mechanism of each actuator set continuously applying a bias force on said shaped working surface producing an elastic field, said shaped working surface deflecting the elastic mechanism of the actuator sets to produce different preloads on the elastic mechanism, the displacement of one or more actuators upsetting equilibrium in said elastic field and producing motion of the working member.

2. A motion conversion mechanism according to claim 1, wherein one end of the elastic mechanism is said stationary extremity.

3. A motion conversion mechanism according to claim 2, wherein said moving mechanism is a free rotating spindle, the said working member comprising an eccentric journal located at one end of the spindle and a bearing fit over the journal, each of the said elastic mechanisms comprising a plunger with one end in contact with the said bearing and a spring pressing against the plunger.

4. A motion conversion mechanism according to claim 2, wherein said moving member and/or working member is a straight member capable of moving in a straight line and with at least one periodically undulant smooth working surface, each of the said elastic mechanisms comprising roller in contact with the said working surface and a plunger on which the roller is attached and a spring pressing against the plunger, the elastic mechanisms being lined up with at least one mutually parallel and equi-distant group, the distance t' between the elastic mechanisms and the period t of the working surface satisfying a certain relation.

5. A motion conversion mechanism according to claim 4, wherein said working member has two axially symmetric working surfaces, the elastic mechanisms being lined up in two symmetric and oppositely disposed group, the said t' and t satisfy the following relation:

$$t' = mt \pm t/n \qquad (1)$$

6. A motion conversion mechanism according to claim 2, wherein said moving member is a free rotating spindle, the said working member comprising an eccentric journal located at one end of the spindle and a bearing fitted over the journal, each of the said elastic mechanisms comprising an elastic lever with its actuating pivot connected to the micro-amplitude actuator and its resisting end, as the output extremity of the actuator set pressing against the said bearing.

7. A motion conversion mechanism, for converting micro amplitude oscillatory motion into continuous motion related to the micro amplitude motion comprising:
   a moving mechanism including a moving member;
   a housing supporting said moving mechanism;
   a plurality of actuator sets equally spaced around said moving mechanism;
   each actuator set including;
   at least an actuator, and an elastic mechanism operatively connected to each actuator;
   said actuator set further including a lever mechanism having a fulcrum and a resisting end with its fulcrum end as the output extremity of the actuator set and its resisting end as the output extremity of the actuator set, its actuating point being connected to one end of the actuator;
   said elastic mechanism including an elastic member and being disposed between an end of the actuator and another stationary extremity of the actuator set, the lever mechanism having an actuating arm which is smaller than a resisting arm; and
   said moving mechanism including a working member which drives the moving member to produce a motion, said working member having a shaped working surface operatively connected with each elastic mechanism to continuously apply a bias force field on said shaped working surface to produce an elastic field, said shaped working surface deflecting the elastic mechanism of the actuator set to produce different preloads on the elastic mechanism, the displacement of one or more actuators upsetting equilibrium in said elastic field and producing motion of said working member.

8. A motion conversion mechanism according to claim 2, wherein each the said actuator set further includes a lever mechanism with its resisting point as the output extremity of the actuator set, and its actuating point connected to one end of the actuator, the other end of said actuator being the stationary extremity, the said elastic mechanism including a stationary supporting block with an elastic arm, the stationary supporting block being another stationary extremity of the actuator set, the said elastic arm being connected to the fulcrum of the lever mechanism.

9. A motion conversion mechanism according to claims 1, 2, 7 or 8, characterized in that a roller in contact with the working surface is attached to the output extremity of the actuator set, the said specially shaped working surface being central symmetric multiwave cylindrical surface, the number of waves m and the number of actuator sets n satisfy the following relation:

$$m = qn \pm r \qquad (2)$$

m, n, q, r are integers and $n/r \geq 3$.

10. The motion conversion mechanism according to claim 2, wherein said moving member is a free rotating spindle, the said working member comprising an elliptical rotor attached to the spindle and a flexible bearing fitted over the elliptical rotor, each of the said elastic mechanisms comprising a segmental block made of elastomer, the segmental surface being acted upon by the said micro-amplitude actuator and the curved inner surface being in contact with the outer race of the said flexible bearing, all other surfaces being restrained rigidly.

11. The motion conversion mechanism according to claim 2 wherein said moving member is a free rotating spindle, the said working number comprises an inclined disc attached to the spindle and a thrust bearing fitted over the inclined disc and a thrust disc on the thrust bearing, the normal of the said inclined disc making a small acute angle with the axis of the spindle, each of the said elastic mechanisms comprising a plunger with one end in contact with the said thrust disc and a spring pressing against the plunger.

12. A motion conversion mechanism for converting micro-amplitude oscillatory motion into continuous related motion, comprising:

a moving mechanism with a moving member;

a housing surrounding the moving member;

a plurality of actuator sets equally spaced around the said moving mechanism, each said actuator set comprising at least an actuator and an elastic mechanism, each actuator set having an output extremity and a stationary extremity attached to a fixed point on the housing,;

the said moving mechanism further including a working member which drives the moving member to produce the related motion, the said working member having a shaped working surface simultaneously biased by all of said elastic mechanisms to establish a potential energy field between said moving mechanism and said elastic mechanisms;

the said actuators deflecting the elastic mechanism of the actuator sets to produce different preloads on the shaped working surface to cause said moving member to move continuously toward the moving minimum potential energy position of the system in the form of continuous motion.

13. A motion conversion mechanism for converting micro amplitude oscillatory motion into continuous motion related to the oscillatory motion comprising:

a moving mechanism including a moving member;

elastic force field means encompassing and being operatively connected to said moving member for providing a continuous elastic bias on said moving member, said elastic bias providing a substantially balanced force on said working member in the absence of an additive force; and actuator means for presenting an additive force to said elastic force field means, said actuator means effecting a perturbation of the elastic force means by upsetting balance of forces acting on the moving member at rest to cause an unbalance of force resulting in an output motion of the moving member.

14. A motion conversion mechanism as in one of claims 1, 2, 7, or 8 in which the number of actuator and elastic mechanisms is six.

15. A motion conversion mechanism according to claim 1, characterized in that the said micro-amplitude actuators are electrostrictive actuators.

16. A motion conversion mechanism according to claim 1 wherein one end of the actuator is the stationary extremity.

17. A motion conversion mechanism according to claim 7 wherein said elastic mechanism includes a spring surrounding said actuator.

18. The apparatus of claim 1 wherein upon actuation of the actuator sets, balance of forces acting on the moving member at rest are upset to cause an unbalance of force resulting in an output motion of the moving member.

19. The apparatus of claim 7 wherein upon actuation of the actuator sets, balance of forces acting on the member at rest are upset to cause an unbalance of force resulting in an output motion of the moving member.

20. The apparatus of claim 19 further including means for moving the moving member in an orbit path upon actuation of the actuator means.

21. The apparatus of claim 19 wherein the moving member has a wavy surface.

22. The apparatus of claim 19 further including a housing surrounding and containing, the moving mechanism, the elastic force field means and the actuator means.

23. The apparatus of claim 22 wherein said actuator means includes a plurality of actuator sets.

24. The apparatus of claim 23 wherein said actuator sets are attached to said housing and are substantially equally spaced from each other.

25. The apparatus of claim 12 wherein upon actuation of the actuator sets, balance of forces acting on the moving member at rest are upset to cause an unbalance of force resulting in an output motion of the moving member.

26. The motion conversion mechanism of claim 13 wherein said elastic force field means and actuator means are collectively formed of at least one elastic actuator.

27. The motion conversion mechanism of claim 26 wherein said elastic actuator is a piezoelectric elastic actuator.

* * * * *

UNITED STATES PATENT AND TRADEMARK OFFICE
CERTIFICATE OF CORRECTION

PATENT NO. : 5,068,565
DATED : November 26, 1991
INVENTOR(S) : Da Xu Huang

It is certified that error appears in the above-identified patent and that said Letters Patent is hereby corrected as shown below:

In the Title: change "MOTOR" to --MOTION--.

Column 3, line 12: change "chaise" to --choice--.

Column 4, line 68: change "number" to --member--.

Column 5, Equation 1: change "$t'=me\pm\ t/n$" to --$t'=mt\pm\ t/n$--.

Column 6, line 6: change "(10b]" to --10b--.

Column 6, line 38: change "3." to --$\geq 3.$--.

Column 7, line 10: change "invention illustrated." to --invention is illustrated.--.

Column 9, line 33, Claim 3, line 5: change "fit" to --fitted--.

Column 9, line 42, Claim 4, line 6: after "comprising" insert --a--.

Column 10, line 12, Claim 7, line 14: change "output" to --stationary--.

Column 12, line 22, Claim 20, line 1: change "19" to --13--.

Column 12, line 25, Claim 21, line 1: change "19" to --13--.

UNITED STATES PATENT AND TRADEMARK OFFICE
CERTIFICATE OF CORRECTION

PATENT NO. : 5,068,565
DATED : November 26, 1991
INVENTOR(S) : Da Xu Huang It is certified that error appears in the above-identified patent and that said Letters Patent is hereby corrected as shown below:

Column 12, line 27, claim 22, line 1, change "19" to --13--.

Signed and Sealed this

Thirteenth Day of April, 1993

Attest:

STEPHEN G. KUNIN

*Attesting Officer*  *Acting Commissioner of Patents and Trademarks*